United States Patent [19]
Ullmann et al.

[11] 3,919,516
[45] Nov. 11, 1975

[54] MOTION TRANSLATION MECHANISM FOR THE TOOL DRIVE OF A MACHINING EQUIPMENT

[75] Inventors: Werner Ullmann, Locarno; Bernd Schumacher, Losone; Peter Marti, Losone; Caspar Vasalli, Losone, all of Switzerland

[73] Assignee: AG fur Industrielle Elektronik AGIE Losone b. Locarno, Losone, Switzerland

[22] Filed: Dec. 14, 1973

[21] Appl. No.: 424,716

[30] Foreign Application Priority Data
Sept. 27, 1973 Switzerland...................... 13877/73

[52] U.S. Cl. ............................ 219/69 E; 219/69 G
[51] Int. Cl.² ......................................... B23K 9/16
[58] Field of Search.... 219/69 R, 69 C, 69 G, 69 V, 219/69 E; 90/15; 408/237; 173/47; 74/88, 110

[56] References Cited
UNITED STATES PATENTS
3,125,664   3/1964   Pfau..................................... 219/69

*Primary Examiner*—Bruce A. Reynolds
*Attorney, Agent, or Firm*—William R. Woodward

[57] ABSTRACT

The vertical tool electrode drive of EDM or ECM equipment is provided with an attachment for converting the vertical drive motion to transverse motion. A housing adjustable in height that can be swung out of the way contains a chuck for receiving vertical movement from the spindle of the machine drive and a mechanism for laterally driving a cross-carriage on which the electrode tool may be mounted for transverse movement. Adjustments in height and for rotating the direction of travel of the cross-carriage are provided.

10 Claims, 4 Drawing Figures

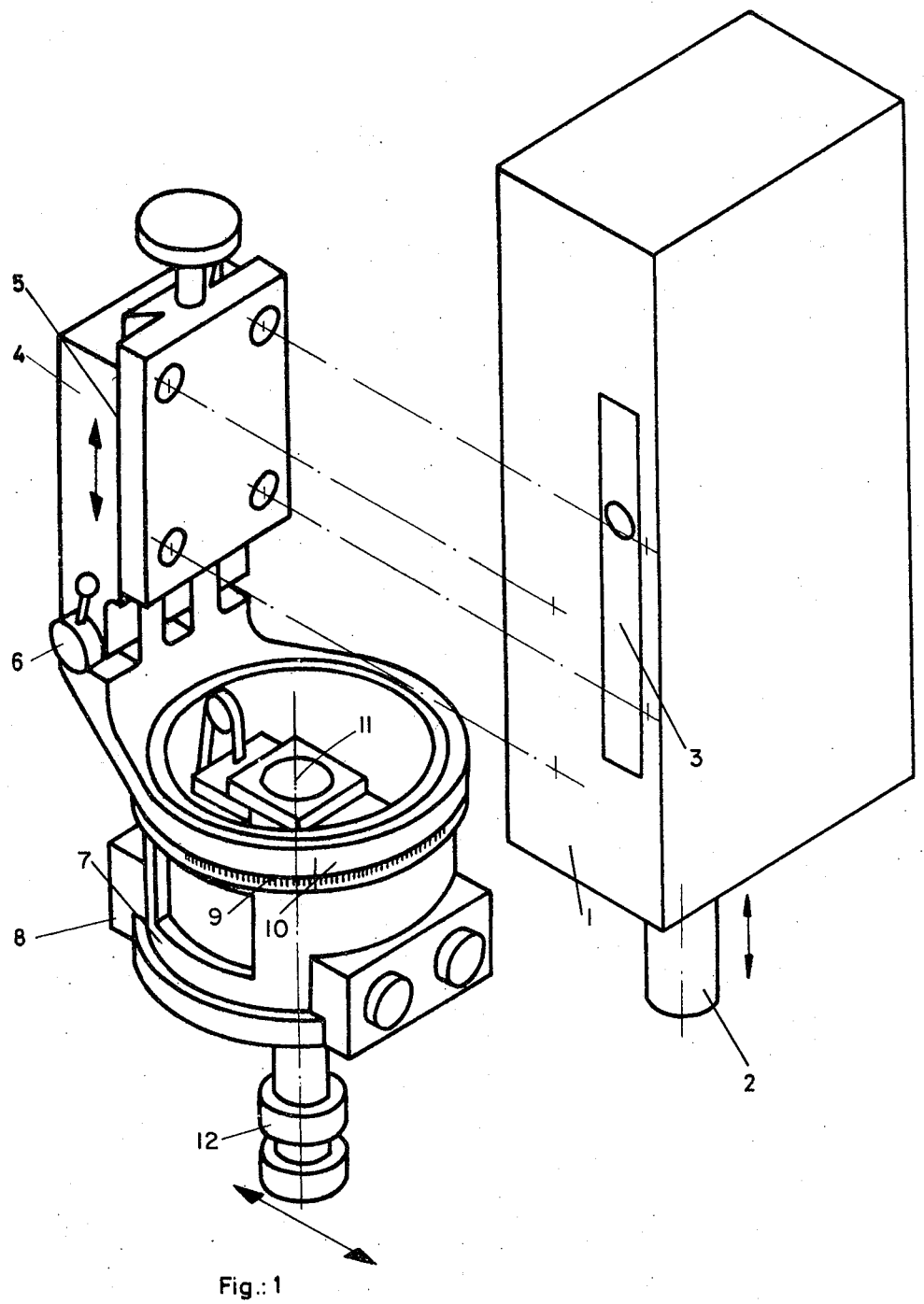
Fig.: 1

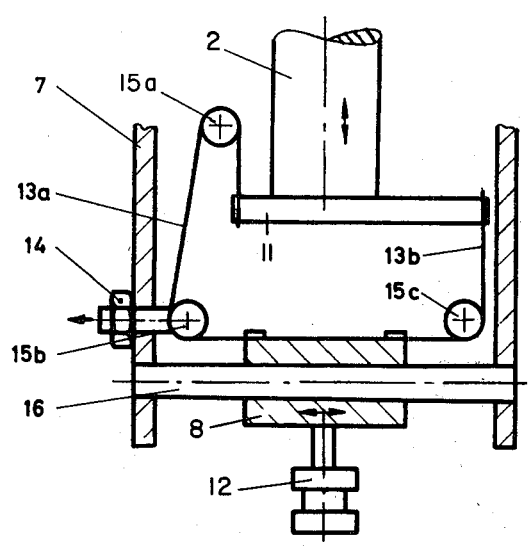
Fig.: 2
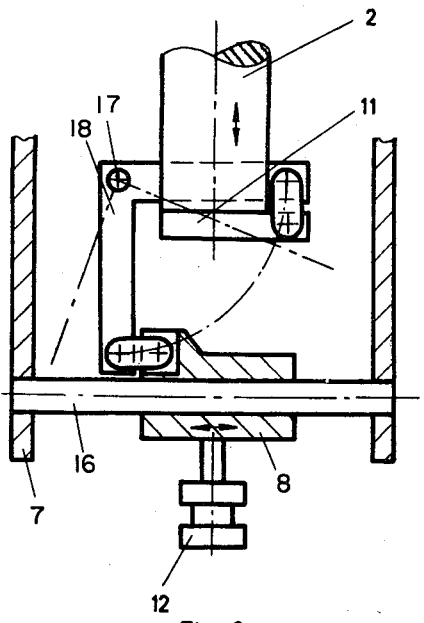
Fig.: 3
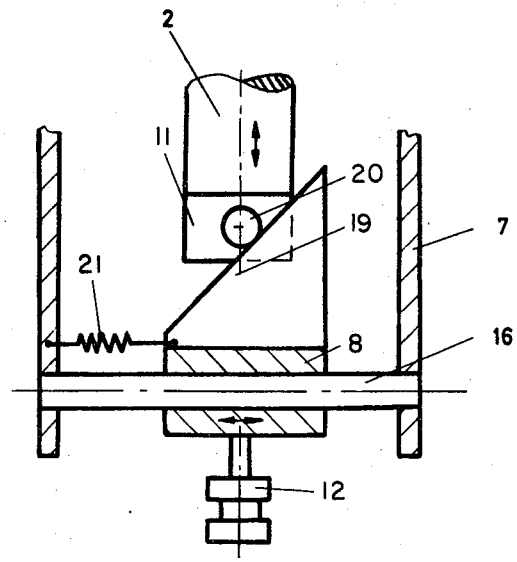
Fig.: 4

MOTION TRANSLATION MECHANISM FOR THE TOOL DRIVE OF A MACHINING EQUIPMENT

This invention concerns a mechanism for changing the direction of motion of the tool advance drive in a machining apparatus, and particularly in equipment for electric discharge machining (EDM) or electro-chemical machining (ECM).

Both electric discharge machining and electrochemical machining involve operation with a gap between the tool and the work piece filled with a machining medium, a liquid to flush the gap in EDM and an electrolyte in ECM. There is a characteristic mode of operation which both EDM and ECM have in common, which is that whenever the spacing between the tool electrode and the work piece being machined approaches a sufficiently small value, an erosion effect (removal of material) is produced by an applied voltage. As a result of the fact that this erosion is effective in almost any direction, these processes are highly versatile with respect to the usable mechanisms for mechanical movement, as disclosed, for example, in U.S. Pat. Nos. 3,461,267, 3,041,442 and 2,902,584 the aforesaid Swiss patents corresponding respectively to U.S. Pat. Nos. 2,902,584 and 3,041,442. The basic characteristic of EDM and ECM are known in the industry.

In the context of this great versatility, it is often desired in shop practice to obtain special mechanical movements by the use of a standard machine having only one drive axis (generally vertical, like a drill press) by affixing accessories with supplementary movements for the particular operation, for example a screw movement for screw threads (U.S. Pat. No. 2,650,979) or a planetary rotation for grinding operations (U.S. Pat. No. 359,808 which corresponds to U.S. Pat. No. 3,125,664). Equipment is also known that as originally manufactured is provided with an advancing drive or servo system for more than one main drive direction, which nevertheless presupposes a higher design and manufacturing cost and a decision for the particular capability at the early stage of ordering the equipment. Also known in shop practice are work piece clamp devices that are provided with movement conversions for particular machining problems. Since these are work piece related and must be designed and built with reference to the work piece, they are expensive and rare.

It is an object of this invention to provide a universal attachment that would make it possible to provide for existing controlled or regulated machining drive equipment, by motion conversion, machining operations directed on any desired axis, preferably arranged transversely, at right angles to the machining equipment's own axis.

Subject matter of the present invention: Briefly, a housing is affixed on the machine head that carries the drive and is so mounted as to be adjustable in height (assuming a vertical drive) relative to the tail spindle that normally carries the tool electrode. This housing is, furthermore, rotatable about the spindle axis and/or capable of being held at an adjustable oblique position with respect to the axis. A sliding carriage is mounted on the housing that carries a chuck for holding the tool electrode and is guided for movement in a direction transverse to the axis on which the tail spindle is advanced. The housing, finally, is provided with a transmission for transmitting the movement of the tail spindle of the machine to the transversely movable carriage and doing so either in a fixed or selectable translation ratio, without backlash or play.

It is an advantage of this construction, in addition to its general utility, that the measuring unit generally provided on the machine head remains usable in connection with the attachment of this invention, with all its measuring, safety, adjustment and disengagement functions, and that with the attachment swung out of the way, preparations of the work-piece with the normally operating machine remain possible. Moreover, as already indicated, there are substantial cost savings compared with special constructions or with installations controlled or regulated on more than one axis.

The invention will be described by way of example with reference to the accompanying drawings, wherein:

FIG. 1 is a perspective view of a complete machining attachment according to the invention, shown in exploded relation with a machine drive and tail spindle;

FIG. 2 is a diagrammatic cross-section of a portion of the attachment having a motion transmission utilizing a band or cable transmission;

FIG. 3 is a cross-section similar to FIG. 2 showing a motion transmission utilizing a swinging linkage, and FIG. 4 is a cross-section similar to FIG. 2 showing a motion transmission utilizing a cam profile transmission.

FIG. 1 shows a machine head 1 of a machining equipment. The advancing tail spindle 2 is mounted in the machine head 1 and driven up or down under control by the drive located within the head. Both the up and down movement can be referred to collectively as movements in the linear direction of the aforesaid drive. Except when equipped with a remotely operated transmission, the machine head also contains a measuring device 3. The attachment of the invention is shown shifted over to the left for purposes of illustration rather than in its mounted position, as indicated by the dot-dash lines. It comprises a base body 4 arranged for mounting on the machine head either directly or by means of a vertical adjustment element 5 for adjusting the height of the device relative to the lower end of the tail spindle 2. At the lower end of the base 4 is a hinge 6 allowing the remainder of the device to be swung out of the way or to be fixed at any desired angle to the axis of the tail spindle, which is aligned in the direction of motion indicated by the double arrow 2a. In operation the hinge 6 is usually set so that the equipment housing 7 is coaxial and, likewise, has its axis aligned with the direction of advancement of the tail spindle, which may be referred to as the drive direction, and so that the direction of movement of the carriage 8 of the device is accordingly perpendicular to the drive direction and to the axis of the tail spindle 2.

By the provision of a rotating joint 9 for the housing or for the carriage mounting with respect to the holding ring 10 hanging on the hinge 6, the direction of movement of the carriage 8 can be made to lie in any desired orientation in the transverse plane. The transmission linkage 11 for transmitting the tail spindle movement to the carriage is attached to the spindle by the normal means for connecting a tool electrode, which may be, for example, by a clamping opening or chuck located within the upper part of the housing 7. The carriage 8 of the device itself has a chuck of the conventional type, not shown in the diagram, for holding the tool electrode 12, so that the latter may be clamped into a positively defined position. Still other arrangements, not shown in the drawing, can be provided for this device for particular purposes, such as the superposition of a supplementary machining motion, for example by a controlled drive to the height adjustment means 5a of the height adjustment plate 5 for the base 4 during the transverse movement of the carriage 8, thus providing complicated relative movements between the work piece (not shown) and the tool electrode 12.

In the form of construction shown in FIG. 2 the transmission of the motion from the actuator 11 connected to the tail spindle 2 over to the cross-carriage 8 is accomplished by transmission band or cable elements 13a, 13b, which are maintained free of backlash by a tension device 14. They are connected to the cross-carriage 8 at both ends by grips free of transverse movement, relieving any transverse forces, so that they can reliably transmit dynamic reciprocating movements as well as smooth progressive movements to the carriage. In order to mitigate friction and backsliding during slow movement, the idler rolls or wheels 15a, 15b and 15c are preferably provided with roller bearings. It is also preferred to mount the carriage 8 in rolling bearings and without play, for example by biased ball retainers (not shown) in cylindrical guides 16.

FIG. 3 shows another form of construction in which the transmission arrangements 11 for transmitting the motion of the tail spindle 2 over to the cross-carriage 8 are pivoted about an axis of rotation 17. These transmission arrangements can consist of gear or friction wheels (not shown) or, as shown in the FIGURE, of an angle lever or bell crank 18 directly connected for motion transmission to the end of the tail spindle 2 and to the cross-carriage 8. If transmission with magnification or reduction of the motion is desired, gears or wheels of different diameter or lever arms of different lengths may be provided.

FIG. 4 also shows arrangements 11 for transmitting motion from the tail spindle 2 over to the carriage 8. Just as in the case of the arrangement of FIG. 3, this arrangement can be either a firmly locked linkage or one held in place by the forces transmitted and developed. In the arrangement symbolized by FIG. 4 the motion transmission connection of the tail spindle and the cross-carriage is provided by an inclined edge 19, which is a particular rectilinear form of the general concept of a cam surface. A template or master plate of a suitable form can be used to provide a straight or curved cam surface as desired. In this case it is the cam 19 that moves in response to the roller 20, or a slider that might be used instead, which corresponds to the follower of the cam, although in this case it applies the force rather than receives it. The proper amount of play and reliable reversal of direction is provided either by spring elements 21, as shown in the FIGURE, or by adjustable counter profiles forming a coulisse with the plate 19. This type of construction permits combination with superposed additional movements, particularly by the use of a master plate 29 of a specially designed profile. Varying the angle of inclination of the wedging profile or of the pattern of the master plate can provide a selectable translation ratio for the movement.

Although the invention has been described with respect to illustrative embodiments, it will be understood that modifications and variations may be made within the inventive concept. For example in the arrangements of FIGS. 2 and 3 operation can readily be performed even when the hinge 6 is not set to align the tool 12 parallel to the axis of the spindle 2. In the arrangement of FIG. 3 this may require a slotted linkage with the lever 18. Such operation is also possible for the arrangement of FIG. 4, but deviation from parallel or coaxial alignment may here more quickly modify the translation characteristic of the device.

We claim:

1. Drive converting apparatus for a machine tool advancing drive of an electro-erosion machine, said tool advancing drive being controllably operable back and forth in one linear direction, being mounted on a drive head and having a controlled motor and a tail spindle axially driven by said motor relative to said drive head, said drive converting apparatus comprising:

a housing (7) mounted on said drive head;

means for adjusting the position of said housing relative to said drive head in at least one of the following modes of relative displacement, namely, translation in said linear direction of said drive, rotation about the axis of said tail spindle, and adjustment of a shiftable fixation permitting adjustable deviation of an axis of said housing from parallelism to the axis of said tail spindle, said axis of said housing being alignable by said adjusting means for such parallelism when no deviation therefrom is desired;

a carriage (8) carried by said housing (7), and guide means for permitting movement of said carriage which is transverse to the axis of said tail spindle when said axis of said housing is aligned as aforesaid, said carriage having chuck means mounted thereon for holding a tool electrode (12), and movement conversion means (11) in said housing (7) for translating the movement of said tail spindle produced by said drive, in a manner substantially free from backlash, into a movement of said carriage (8) along said guide means.

2. Apparatus according to claim 1 in which, in addition to the provision as aforesaid for conversion of the controllable movement of the tail spindle produced by said drive into movement of said carriage in a transverse direction, means are provided for applying in superimposed fashion at least one additional movement to said chuck.

3. Apparatus according to claim 1 in which said movement conversion means (11) for actuating said carriage (8) comprises at least one tensioned flexible elongated element (13) free of transverse forces.

4. Apparatus according to claim 3, in which said tensioned flexible elongated element (13) is a flexible and substantially inextensible strip of flattened cross-section.

5. Apparatus according to claim 3, in which said flexible elongated element is a flexible and substantially inextensible filament of round cross-section.

6. Apparatus according to claim 1 in which said movement conversion means (11) for actuating said carriage (8) is constituted by a train of pivotally linked mechanical members including at least one member mounted for swinging about a pivot fixed on said housing.

7. Apparatus according to claim 1, in which said movement conversion means (11) are provided with means for setting the translation ratio of said movement conversion means at a selectable value within a range of available translation ratios.

8. Apparatus according to claim 1, in which said movement conversion means (11) for actuating said carriage (8) is constituted by an engagement body (20)

and a body providing a guiding surface (19) and means (21) for maintaining said engagement body in contact with said guiding surface.

9. Apparatus according to claim 8, in which said engagement body is a roller.

10. Apparatus according to claim 8, in which said engagement body is a slider.

* * * * *